UNITED STATES PATENT OFFICE.

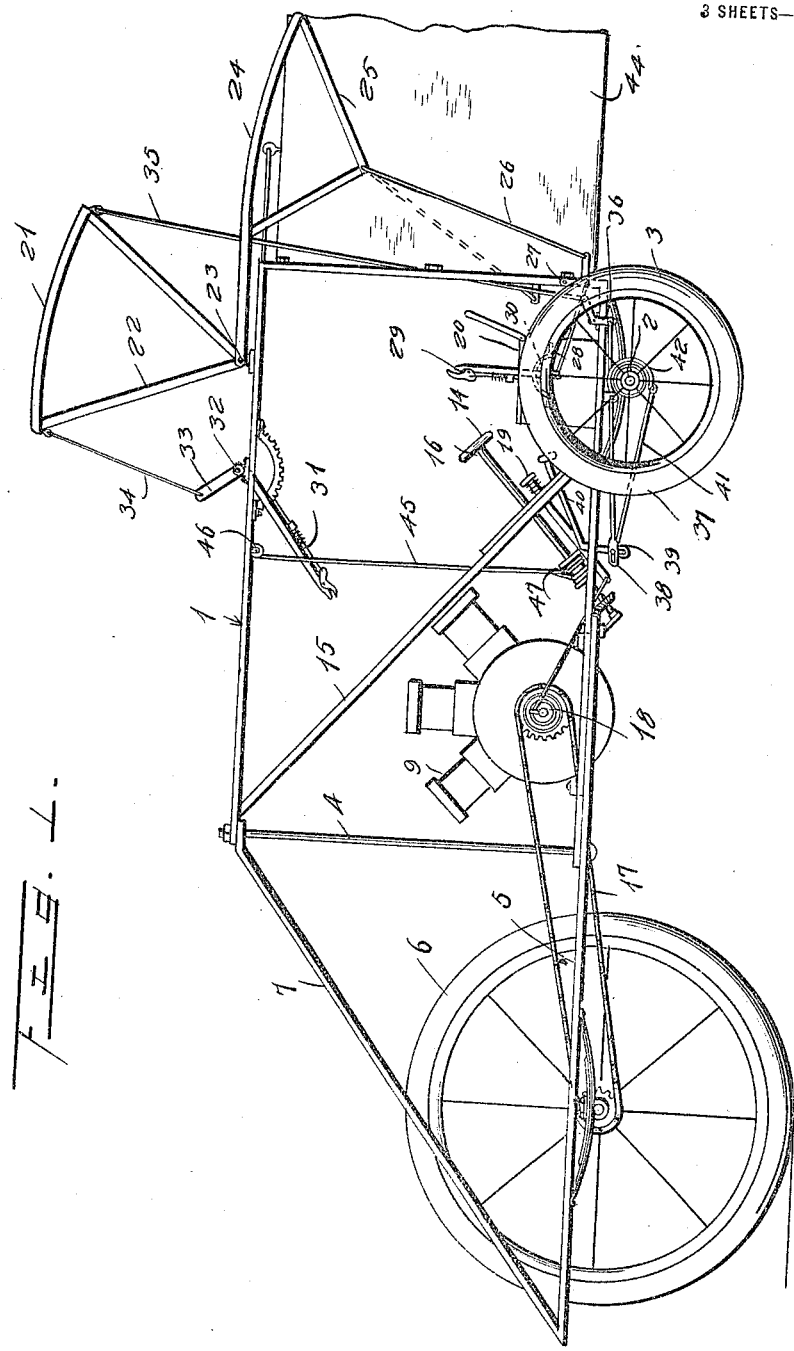

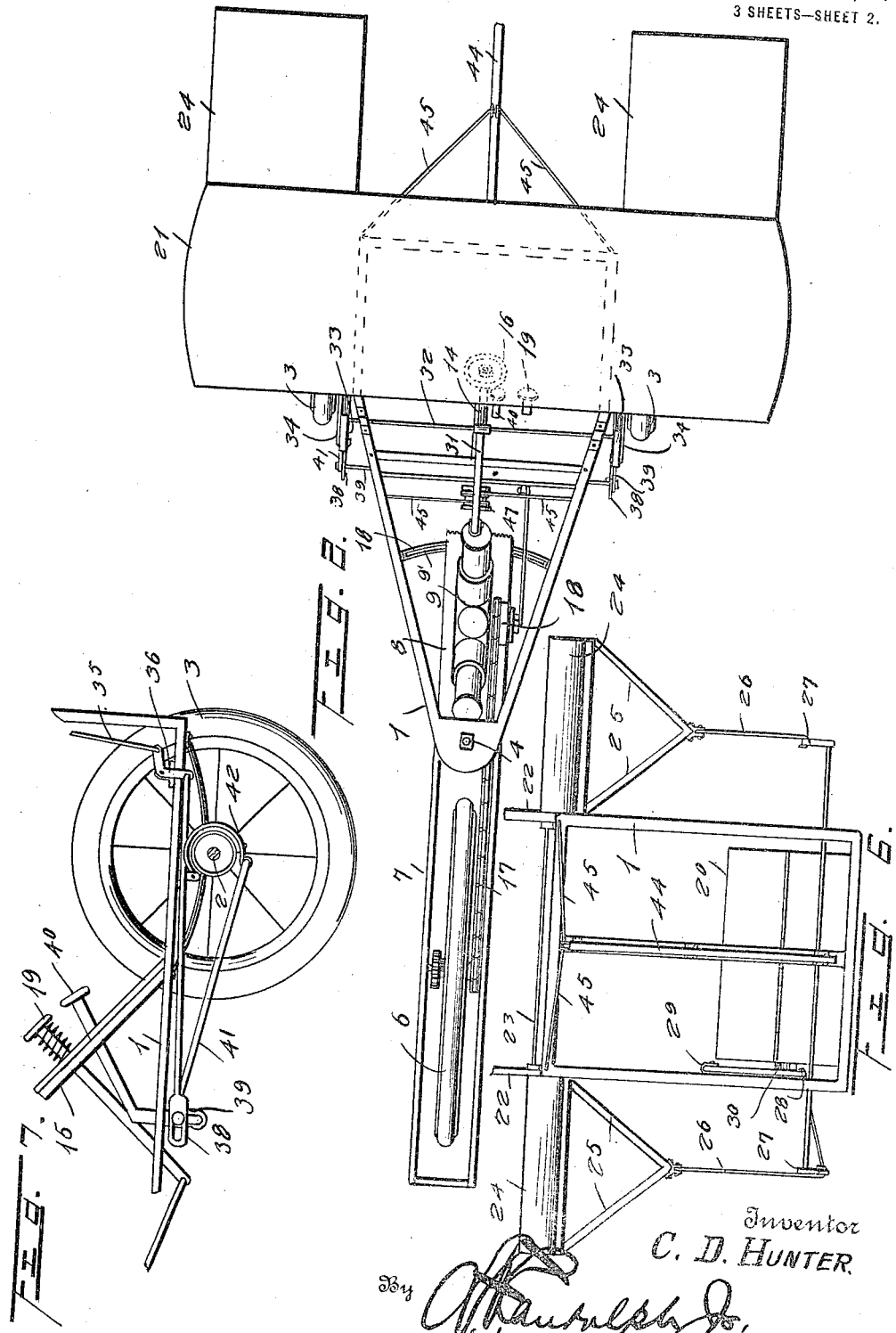

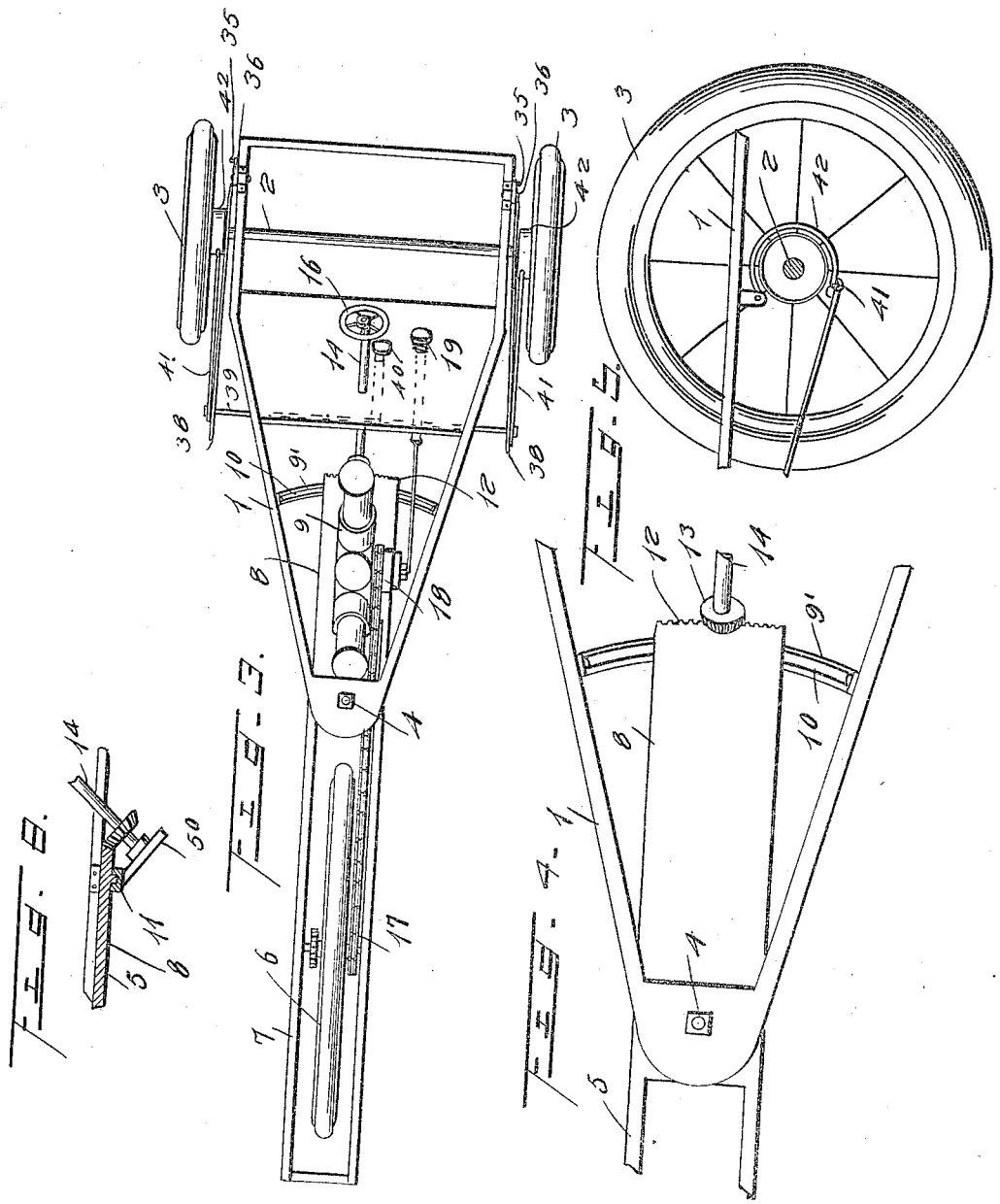

CHARLES D. HUNTER, OF NEWPORT NEWS, VIRGINIA.

COMBINED MOTOR-CYCLE AND AEROPLANE.

1,307,097.  Specification of Letters Patent.  Patented June 17, 1919.

Application filed October 1, 1918. Serial No. 256,418.

*To all whom it may concern:*

Be it known that I, CHARLES D. HUNTER, a citizen of the United States, residing at Newport News, in the county of Warwick and State of Virginia, have invented certain new and useful Improvements in Combined Motor-Cycles and Aeroplanes; and I do hereby declare the following to be a full, clear, and exact description of the invention, such as will enable others skilled in the art to which it appertains to make and use the same.

This invention relates to improvements in combined motorcycles and aeroplanes and has for one of its objects the provision of a device of this character whereby one portion of the device is capable of traveling in the air while the other portion travels on the ground, thus providing a comparatively easy riding device and one that is capable of traveling at a very high rate of speed without the dangers that are frequent in ordinary flying machines.

Another object of this invention is the provision of a frame having a ground wheel at its forward end adapted to be driven by a suitable power source and planes carried by the rear end of the frame so that a portion of the frame is supported in the air while the other portion is carried by the ground wheel.

A further object of this invention is the provision of ground wheels journaled to the rear end of the frame so that the entire device can travel upon the ground when moving at a comparatively slow rate of speed and which will coöperate in supporting the device in an upright position when standing still or idle.

A still further object of this invention is the provision of a combined motorcycle and aeroplane of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention reference is to be had to the following description and accompanying drawings, in which:—

Figure 1 is a side elevation partly in section of a combined motorcycle and aeroplane constructed in accordance with my invention, Fig. 2 is a top plan view of the same, Fig. 3 is a longitudinal sectional view illustrating the means of driving or rotating the front ground wheel, Fig. 4 is a detail sectional view illustrating the manner of mounting the propelling source and also the means of steering the front ground wheel, Fig. 5 is a detail view illustrating the brake used upon the rear wheel, Fig. 6 is a fragmentary rear elevation illustrating the means for controlling the side planes, Fig. 7 is a detail sectional view illustrating the manner of operating the brake, Fig. 8 is a detail sectional view of the steering mechanism for the front ground wheel.

Referring to the drawings, the numeral 1 indicates a frame having secured to its rear end an axle 2 on which are journaled rear ground wheels 3. The frame 1 carries at its forward end, which is tapered as clearly illustrated in Figs. 3 and 4, a king bolt 4, to which is pivoted a front fork 5. The front fork 5 has journaled thereto a front ground wheel 6 adapted to travel upon the ground at all times. Braces 7 are connected to the forward end of the fork 5 and to the upper forward end of the frame 1 at its point of connection with the upper end of the king bolt 4. The fork 5 has formed upon its rear end a motor supporting base 8 on which is mounted an internal combustion engine 9 or any other suitable power source. The base 8 is supported upon an arcuate shaped track 9' carried by the frame 1 and is provided with a groove 10 which receives a lug 11 formed upon the under face of the base 8. The rear edge of the base 8 has formed thereon a series of arcuately arranged teeth 12 which mesh with a pinion 13 carried by a steering post 14. The steering post 14 is journaled in a brace 15 of the frame 1 carrying at its upper end a steering wheel 16 whereby the front ground wheel 6 can be turned laterally of the frame 1 in either direction for steering the device.

The front wheel 6 is driven by the engine 9 through an endless chain 17. The engine is also provided with a clutch mechanism 18 of any desired construction controlled by a clutch pedal 19 so that the driving action of the engine upon the front wheel 6 can be stopped at any time desired. A seat 20 is carried by the frame 1 and located in close proximity to the steering wheel 16 so that the operator can be seated while riding.

An elevating plane 21 extends transversely and over the rear end of the frame 1 and is pivotally connected thereto by struts or braces 22. The braces 22 are preferably pivotally connected to a transversely extending rod 23 extending across the frame 1 and which rod also has pivotally connected thereto the forward ends of side planes 24 provided with braces 25. The braces 25 have connected thereto rods 26 which are in turn connected to the ends of a pivotally mounted lever 27. The lever 27 is pivoted to the frame 1 and has connected thereto a rod 28 which is connected to the lower end of a controlling lever 29. The controlling lever 29 moves over a quadrant 30 carried by the frame of the seat 20 for the purpose of raising and lowering the side planes alternately, or, in other words, upon moving the lever 29 on one direction, one of the planes will be lowered while the other plane will be raised, and vice versa when the lever 29 is moved in an opposite direction.

A controlling lever 31 is pivoted to the frame 1 as illustrated at 32 and has an angularly related end 33 connected to a rod 34. The rod 34 is connected to the forward edge of the elevating plane 21 whereby the same can be rocked upon its pivot 23 for causing the rear end of the frame 1 to ascend or descend according to the desire of the operator. A rod 35 is connected to the rear edge of the elevating plane 21 and is in turn connected to a bell crank lever 36. The bell crank lever 36 is pivoted to the frame 1 and has connected thereto a rod 37 provided with an elongated slot 38. The elongated slot 38 receives a pin 39 forming the pivotal connection between the foot pedal 40 and the brake rods 41. The brake rods 41 are connected to brakes 42 operable upon brake drums secured to the rear wheels 3 so that when the elevating plane 21 is swung forwardly to cause the rear end of the frame 1 to descend the brakes 42 will be automatically applied and stopping the device as soon as the rear wheels 3 come in contact with the ground. The foot pedal 40 is adapted to apply the brakes 42 when the device is traveling entirely upon the ground at a comparatively slow rate of speed.

A rudder 44 is pivoted to the rear end of the frame 1 and has connected thereto actuating cables 45 that extend over pulleys 46 on the frame 1 and are connected to a drum 47 on the steering post 14. The cables 45 are adapted to wind upon the drum 47 in opposite directions so that upon turning the steering post in one direction the rudder will be turned in a corresponding direction and vice versa when the steering post is turned in the other direction.

In operation, the engine is started and the device is ready to travel along the ground with the rear wheel 3 in contact with the same until the device reaches a speed of approximately twelve to fifteen miles per hour and the operator then swings the elevating plane 21 rearwardly so that its forward edge is disposed uppermost while its lower edge is disposed lowermost permitting the air to get under the plane causing the rear end of the frame 1 to ascend. The side planes 24 are then held in a position as illustrated in Fig. 1 for operating with the elevating plane 21 in supporting the rear end of the device in the air. The device then can travel along at a high rate of speed with the front wheel 6 in contact with the ground and being driven by the engine 9. When it is desired to make a turn or to travel about a curve in a roadway, the steering wheel 14 is turned in the direction desired causing the rudder 44 to swing simultaneously, swinging the fork 5 in a corresponding direction permitting the easy travel about the curve. When the device is traveling upon a curve the lever 29 is actuated by the operator to raise one of the side planes 24 and lower the other side planes so as to keep the device properly balanced while traveling upon the curve.

The lower end of the steering post 14 is preferably supported by a bracket 50 carried by the arcuate shaped track 9'.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A device of the character set forth comprising a frame, a fork pivoted to the forward end of said frame, a drive and ground wheel journaled to said fork, means rotating said wheel, ground wheels carried by the frame, and means carried by the frame for supporting the same in the air when the device is in motion.

2. A device of the character set forth comprising a frame, a fork pivoted to said frame, a propelling and steering wheel journaled to said fork, means rotating said wheel, ground wheels journaled to the rear end of the frame, and planes carried by said frame for supporting the same in the air when the device is in motion.

3. A device of the character set forth comprising a frame, a steering mechanism connected to said frame, a front wheel connected to said frame and steering mechanism, means driving said wheel, ground wheels journaled to said frame, an elevating plane connected to said frame, means actuating said plane, and side planes connected to said frame.

4. A device of the character set forth comprising a frame, a front wheel rotatably and pivotally connected to the frame, means rotating said wheel, means steering the front wheel, rear wheels journaled to the frame, brakes for said wheels, means actuating said brakes, planes carried by said frame, means actuating said planes, and means connected to one of the planes and to the brakes for automatically applying the brakes when the device is descending.

5. A device of the character set forth comprising a frame, a driving and steering wheel connected to the frame, ground wheels connected to the frame, means driving the steering and drive wheel, a rudder connected to the frame, means connecting the rudder to the steering mechanism, an elevating plane connected to the frame, side planes connected to the frame, and means actuating said planes.

6. A device of the character set forth comprising a frame, a fork pivoted to said frame, a wheel journaled to said fork, a motor base carried by said fork, a motor carried by said base and connected to the wheel, and steering means swinging the fork laterally of the frame in either direction, a rudder connected to the frame, means connecting the rudder with the steering mechanism, ground wheels journaled to the frame, and planes carried by the frame.

7. A device of the character set forth comprising a frame, a steering and driving wheel connected to the frame, ground wheels connected to the frame, means steering the device, an elevating plane connected to the frame, means controlling the elevating plane, side planes connected to the frame, and means for alternately raising and lowering the side planes.

In testimony whereof I affix my signature in presence of two witnesses.

CHARLES D. HUNTER.

Witnesses:
E. A. DOUGHERTY,
THOS. G. O'NEILL.

Copies of this patent may be obtained for five cents each, by addressing the "Commissioner of Patents, Washington, D. C."